Figure 1:
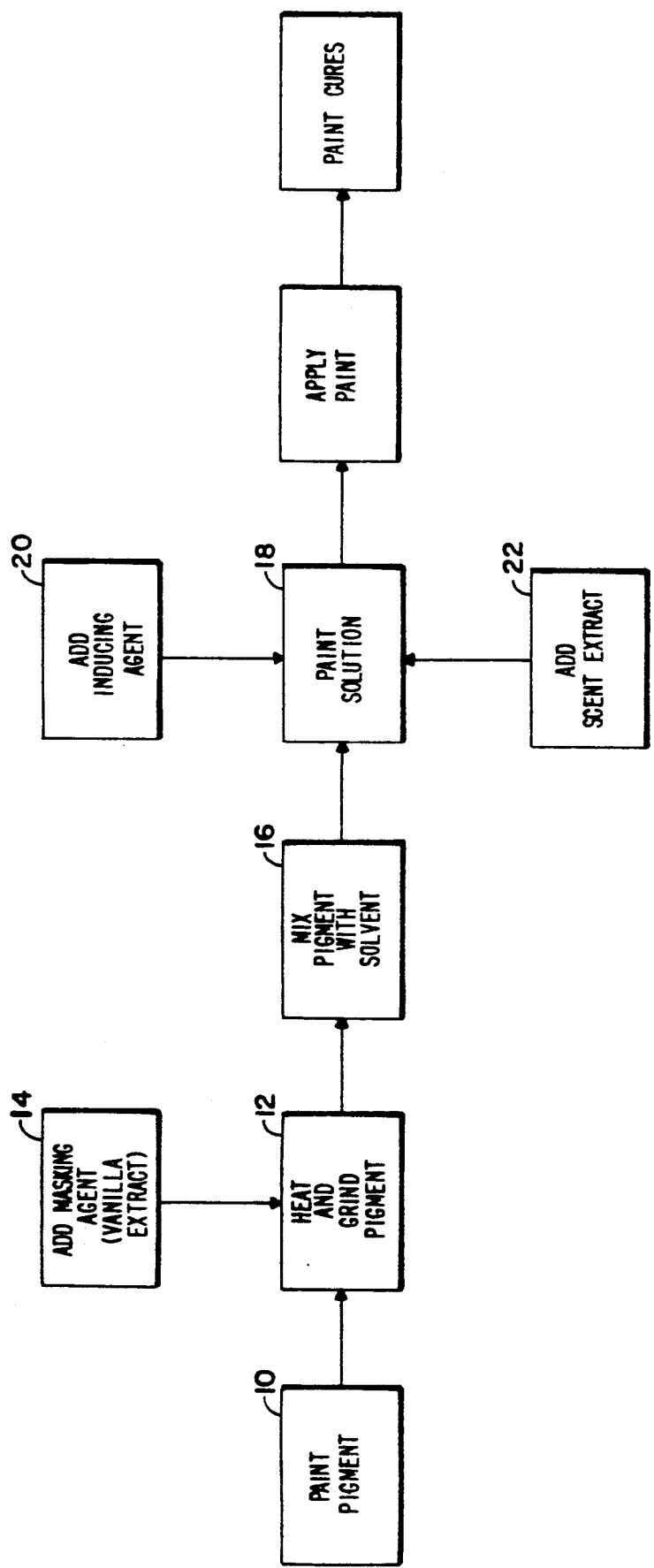

United States Patent [19]

Hinkle et al.

[11] Patent Number: 5,078,792
[45] Date of Patent: Jan. 7, 1992

[54] SCENTED PAIN COMPOSITION AND METHOD FOR MAKING SAME

[76] Inventors: Otis Hinkle, P.O. Box 1513; Paul Stoeckert, P.O. Box 1761, both of LaBelle, Fla. 33935

[21] Appl. No.: 498,897

[22] Filed: Mar. 26, 1990

[51] Int. Cl.[5] .......................... C04B 14/00; C08K 5/00
[52] U.S. Cl. .................................. 106/400; 106/401; 106/493; 106/499
[58] Field of Search ...................... 106/15.05, 208, 400, 106/228, 280, 401, 493, 499, 712, 802

[56] References Cited

U.S. PATENT DOCUMENTS 4,160,750  7/1979  Columbus et al. .......... 260/17.4 ST
4,623,390  11/1986  Delmonico ...................... 106/15.05

OTHER PUBLICATIONS

"The Best of Helpful Hints", edited by Pinkham et al., 1978, p. 67.

Primary Examiner—William R. Dixon, Jr.
Assistant Examiner—Michael Marcheschi
Attorney, Agent, or Firm—William E. Noonan

[57] ABSTRACT

A scented pain composition is manufactured by mixing a predetermining masking agent with a selected pain pigment. A selected solvent is mixed with the pigment to form a paint solution. A predetermined inducing agent and a selected scent extract are mixed with the paint solution such that the inducing agent disperses the scent extract throughout the pain solution to provide the paint solution with a select scent.

12 Claims, 1 Drawing Sheet

SCENTED PAIN COMPOSITION AND METHOD FOR MAKING SAME

FIELD OF THE INVENTION

This invention relates to a scented paint composition and a method for making such a composition and, more particularly, to a paint which substitutes an aesthetically pleasing scent for the obnoxious odor typically exhibited by fresh paint.

BACKGROUND OF THE INVENTION

Most fresh paints exhibit a strong and obnoxious odor, especially during application and before they fully dry. Painting indoors is particularly difficult because windows are typically closed and ventilation is often poor. The resulting paint smell is not only annoying, it can pose a serious health hazard to persons with respiratory ailments and pregnant women.

To date, people have been required to avoid the painted area until the harsh odor dissipates. This is at best an inconvenient solution and for the painter it is virtually impossible. Face masks, fans and open windows may reduce the odor somewhat but do not fully alleviate the problem.

SUMMARY OF INVENTION

It is therefore an object of this invention to provide a scented paint which eliminates the obnoxious and often dangerous odor typically exhibited by fresh paint and replaces that odor with a selected aesthetically pleasing scent.

It is a further object of this invention to provide a scented paint which significantly reduces the unpleasant effects and health hazards presented by conventional paints;

It is a further object of this invention to provide a scented paint which exhibits a pleasing scent which lasts at least until the paint cures.

It is a further object of this invention to provide a scented paint which may be manufactured quickly, conveniently and relatively inexpensively.

It is a further object of this invention to provide a scented paint which exhibits one of a wide of variety of scents selected to match the color of the applied paint.

This invention results from a realization that an improved scented paint may be obtained by employing a masking agent to eliminate the unpleasant scent and then imparting the desired scent throughout the paint by the addition of a scent extract in conjunction with a predetermined inducing or dispersing agent. Accordingly, this invention features a scented paint composition that includes a selected paint solvent. A selected paint pigment and a predetermined masking agent are mixed with the solvent to form a paint solution. A selected scent extract is mixed with the solution. A predetermined inducing agent is mixed with the paint solution for dispersing the scent extract throughout the paint solution.

In a preferred embodiment, the scent masking agent includes vanilla extract. The masking agent may include a concentration of at least 0.03% and no greater than 0.25% of the paint solution. The inducing agent may include a soap. Various other defoaming substances may also be employed as the inducing agent. The concentration of the inducing agent is preferably at least 0.03% and no greater than 0.25% of the paint solution. Similarly, the concentration of the scent extract is at least 0.03%, but no greater than 0.25% of the paint solution.

This invention also features a method of manufacturing the scented paint composition. The predetermined masking agent is first mixed with a selected paint pigment. A selected solvent is then mixed with the pigment to form a paint solution. Finally, a predetermined inducing agent and a selected scent extract are mixed with the paint solution such that the inducing agent disperses the scent extract throughout the paint solution to provide the paint with a selected scent.

This method may further include the steps of grinding and/or heating the pigment as the masking agent is mixed therewith. Typically, the pigment is heated, preferably to at least 90 degrees but no greater than 212 degrees Fahrenheit. The mixing continues as the solvent, inducing agent and the scent extract are added.

DISCLOSURE OF PREFERRED EMBODIMENT

Other objects, features and advantages will occur from the following description of a preferred embodiment and the accompanying drawing, in which:

FIG. 1 is a schematic view illustrating a method of making the scented paint composition of this invention.

The scented paint of this invention may be manufactured by mixing a selected paint pigment with a selected paint solvent in a conventional manner and adding a masking agent, inducing agent and scent extract in a manner such as described below. A schematic diagram illustrating this process is shown in FIG. 1.

Initially, a paint pigment 10 having a desired color is selected. That pigment is ground and heated, step 12 in a conventional manner, such as in a drum or mixing vat, known to those skilled in the art. Before or during this step, a masking agent 14, such as vanilla extract or vanillin, is added to and mixed with the pigment. This masking agent covers and minimizes the odor naturally emitted by the pigment and the subsequently formed paint. The amount of masking agent which is added is selected to minimize the natural scent to the greatest degree possible. Preferably, the concentration of the masking agent 14 is between 0.03% and 0.25% of the desired volume. For example, if 100 gallons of paint are to be formed, approximately 4 ounces to 32 ounces of masking agent should be added. If less than this amount is added, the natural scent will not be sufficiently masked. On the other hand, if more than this amount is added, virtually no greater scent reduction is achieved and the masking agent is wasted.

Typically, the pigment and masking agent are heated to at least 90 degrees for between 15 and 20 minutes. At the completion of this step, the pigment is mixed, step 16, with a conventional paint solvent to form a paint solution 18. This solvent may comprise various known oil and water based paint solvents. It is expected that such solvents will typically include latex, acrylic and other water based solvents. In most cases, the solvent will constitute over 90% of the paint solution.

The paint solution is mixed, for example, in a drum, mixer or vat, in a conventional manner for approximately 30 minutes. Typically, during this stage, a shearing blade is employed to mix the solution. As a result, the paint solution remains heated to approximately 90 degrees. At the same time, a desired scent extract 20 and inducing agent 22 are mixed with the paint solution. Typically, the scent extract is selected to match the color of the predetermined pigment 10. For example, if a green paint is being mixed, a pine scent may be selected. Alternatively, if a yellow pigment is employed, a lemon scent may be selected. The particular colors and scents may vary widely and are not a limitation of the invention. Matching the scent to a particular color has not been previously known, however.

Inducing agent 22 is typically added to the paint solution prior to the addition of the scent extract. In alternative embodiments, however, the inducing agent may be added contemporaneously with or after the scent extract. Inducing agent 20 is selected, according to the formula of the paint solution, to optimally disperse the scent extract throughout the solution. This inducing agent may comprise a formulated soap, such as 666 formulated soap or other types of defoaming substances. Previously such defoaming substances have been used to minimize foaming of paint. However, they have not been employed to assist in spreading or dispersing a scent extract throughout a paint solution. It is believed that the scent is effectively imparted substantially evenly throughout the paint by adding inducing agent 20, in combination with the heating and grinding processes. More particularly, the heating, grinding and inducing agent cause hydrogen ions (H+) in the paint to repel such that the scent extract 22 is imparted substantially evenly throughout the paint solution. The scent is then held by the paint so that it dissipates gradually while the paint cures, as described below.

The preferred concentrations of the inducing agent and scent extract are comparable to the concentration of the masking agent. More particularly, each has a desired concentration range of between 0.03% and 0.25% of the completed paint composition. Accordingly, in a 100 pound batch of paint, typically between 4 ounces and 32 ounces of each ingredient is used. Utilizing amounts below that concentration level do not provide for optimum results; whereas utilizing more than these concentrations provides very little scent enhancement and tends to waste the ingredients.

Mixing and heating of the paint solution continue as the inducing agent 20 and the scent extract 22 are added. Generally the mixing is performed from 20 to 45 minutes at between 60 degrees and 212 degrees. Higher temperatures would likely cause evaporation of the solvent. In any event, the times and temperatures set forth herein are illustrative only and are not a limitation of this invention.

When the paint has sufficiently cooled, it may be applied immediately or stored in a container for later use. In either case, the imparted scent is released gradually and emitted by the paint while it remains in its liquid state. Accordingly, the aesthetically pleasing scent is exhibited while the paint is being applied and thereafter, at least until the paint dries or cures on the painted surface. As a result, a much more pleasant environment is provided for the painter and, if a room has been painted, that room may be used almost immediately. The painter does not require a face mask, fans are not needed and the windows may even remain closed. This is particularly helpful during the winter to avoid heat loss.

Eliminating the obnoxious odor that normally accompanies a freshly painted room also greatly benefits persons whose health can be adversely affected by such smells. This includes persons with respiratory ailments and expectant mothers.

Other embodiments will occur to those skilled in the art and are within the scope of the following claims.

What is claimed is:

1. A method of manufacturing a scented paint composition comprising:
    mixing a masking agent with a selected paint pigment alone to form an initial mixture consisting of said pigment and masking agent;
    mixing a selected solvent with said initial mixture to form a paint solution; and
    mixing an inducing agent and a selected scent extract with said paint solution such that said inducing agent disperses said scent extract throughout said paint solution to provide said paint solution with a selected scent.

2. The method of claim 1 further including the step of grinding said pigment as said masking agent is mixed therewith.

3. The method of claim 1 further including the step of heating said pigment and said paint solution as said composition is formed.

4. The method of claim 3 in which said paint solution is heated by driving a shearing blade through said solution.

5. A scented paint composition manufactured according to the process of claim 1.

6. The composition of claim 5 in which said scent masking agent includes vanilla extract.

7. The composition of claim 5 in which said masking agent includes a concentration of at least 0.03% and no greater than 0.25% of said paint solution.

8. The composition of claim 5 in which said inducing agent includes a soap.

9. The composition of claim 5 in which said inducing agent includes a defoaming substance.

10. The composition of claim 5 in which said concentration of said inducing agent is at least 0.03% and no greater than 0.25% of said paint solution.

11. The composition of claim 5 in which said concentration of said scent extract is at least 0.03% but no greater than 0.25% of said paint solution.

12. A method of manufacturing a scented paint composition comprising:
    mixing a masking agent with a selected paint pigment alone to form an initial mixture consisting of said pigment and masking agent;
    mixing a selected solvent with said initial mixture to form a paint solution; and
    mixing an inducing agent and a selected scent extract with said paint solution such that said inducing agent disperses said scent extract throughout said paint solution to provide said paint solution with a selected scent, each of said masking agent, inducing agent and scent extract having a concentration that is at least 0.03% and no greater than 0.25% of said paint solution.

* * * * *

UNITED STATES PATENT AND TRADEMARK OFFICE
CERTIFICATE OF CORRECTION

PATENT NO.  : 5,078,792

DATED       : Jan. 7, 1992

INVENTOR(S) : Otis Hinkle, et al.

It is certified that error appears in the above-identified patent and that said Letters Patent is hereby corrected as shown below:

On the title page, in item [54], change "PAIN" to --PAINT--;

On the title page, in item [57] ABSTRACT, line 1, change "pain" to --paint--;

line 7, change "pain" to --paint--;

Column 1, line 1, in the title, change "PAIN" to --PAINT--.

Signed and Sealed this

Twenty-first Day of April, 1992

Attest:

HARRY F. MANBECK, JR.

*Attesting Officer*    *Commissioner of Patents and Trademarks*